US012741688B2

(12) United States Patent
Shin

(10) Patent No.: US 12,741,688 B2
(45) Date of Patent: Sep. 22, 2026

(54) VEHICLE STEERING DEVICE AND METHOD FOR ASSEMBLING THE SAME

(71) Applicant: HL MANDO CORPORATION, Pyeongtaek-si (KR)

(72) Inventor: Woo Jin Shin, Incheon (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/974,223

(22) Filed: Dec. 9, 2024

(65) Prior Publication Data

US 2025/0313257 A1 Oct. 9, 2025

(30) Foreign Application Priority Data

Apr. 5, 2024 (KR) ........................ 10-2024-0046987

(51) Int. Cl.
*B62D 1/184* (2006.01)

(52) U.S. Cl.
CPC .................................... *B62D 1/184* (2013.01)

(58) Field of Classification Search
CPC . B62D 1/184; B62D 1/20; B62D 1/16; B60Y 2304/07; B60Y 2400/83; B60Y 2410/102; B60R 25/0211; B60R 25/02113; B60R 25/02131; B60R 25/02134
See application file for complete search history.

(56) References Cited

U.S. PATENT DOCUMENTS

2009/0056493 A1* 3/2009 Dubay .................... B23P 15/00 29/434
2009/0266195 A1* 10/2009 Tanke .................... B62D 1/184 74/493
2018/0238400 A1* 8/2018 Magnus .................. F16D 11/16

FOREIGN PATENT DOCUMENTS

| | | | | |
|---|---|---|---|---|
| EP | 0860344 A2 * | 8/1998 | B63H 25/12 |
| FR | 2730971 A1 * | 8/1996 | B23P 11/00 |
| KR | 100657748 B1 | 12/2006 | |
| KR | 20140089937 A | 7/2014 | |
| KR | 101678191 B1 | 11/2016 | |

OTHER PUBLICATIONS

Daumal, FR-2730971-A1, Machine Translation of Specification (Year: 1996).*

* cited by examiner

*Primary Examiner* — Robert A. Siconolfi
*Assistant Examiner* — Matthew Joseph Ganci
(74) *Attorney, Agent, or Firm* — Seed Intellectual Property Law Group LLP

(57) ABSTRACT

According to the present embodiments, there may be provided a vehicle steering device, comprising a steering shaft having a toothed portion having a plurality of mountains and valleys axially formed on an outer circumferential surface of an end portion thereof and circumferentially arranged, and rotated with a steering wheel to transfer a steering force, an upper column formed in a hollow shape and having the steering shaft coupled to and rotatingly supported on an inner circumferential side thereof, and a shaft fixing member having one side end coupled to the steering shaft and another side end coupled to the upper column to fix the steering shaft, and a method for assembling the same.

17 Claims, 11 Drawing Sheets

103
101
105
107
120
100
110

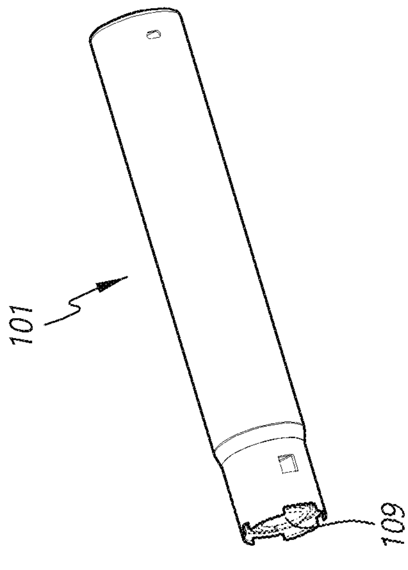
101
109
FIG.2
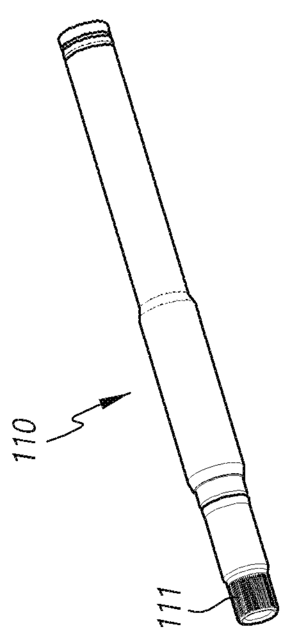
110
111
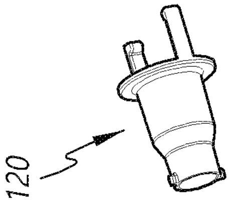
120

VEHICLE STEERING DEVICE AND METHOD FOR ASSEMBLING THE SAME

CROSS-REFERENCE TO RELATED APPLICATION

This application claims priority from Korean Patent Application No. 10-2024-0046987, filed on Apr. 5, 2024, which is hereby incorporated by reference for all purposes as if fully set forth herein.

BACKGROUND

Technical Field

The present embodiments relate to a vehicle steering device and a method for assembling the same.

Description of Related Art

A vehicle steering device comes with telescoping and tilting features by which the driver may adjust the protrusion and tilt angle of the steering wheel to fit his height or body shape to enable smooth steering.

Recent steer-by-wire (SBW) steering devices achieve vehicle steering using an electric motor, instead of components for mechanically linking components, such as universal joint or pinion shaft, between the steering wheel and the wheels.

However, if the steering shaft is turned while the steering column transports, a separate process for aligning to the neutral position with the steering wheel is required, adding a burden to the working process.

Thus, a need arises for research for a vehicle steering device and an assembly method thereof, which may prevent rotation of the steering shaft while the steering column transport while enhancing assemblability and minimizing cost increases.

BRIEF SUMMARY

Conceived in the foregoing background, the present embodiments relate to a vehicle steering device and a method for assembling the same, which may prevent rotation of the steering shaft while the steering column transports and enhance assemblability, simplify the assembly process, and minimize cost increases by implementing an anti-shaft rotation structure easy to remove and assemble from/with the steering wheel.

According to the present embodiments, there may be provided a vehicle steering device, comprising a steering shaft having a toothed portion having a plurality of mountains and valleys axially formed on an outer circumferential surface of an end portion thereof and circumferentially arranged, and rotated with a steering wheel to transfer a steering force, an upper column formed in a hollow shape and having the steering shaft coupled to and rotatingly supported on an inner circumferential side thereof, and a shaft fixing member having one side end coupled to the steering shaft and another side end coupled to the upper column to fix the steering shaft.

Further, according to the present embodiments, there may be provided a method for assembling a steering device, comprising a shaft aligning step of aligning a steering shaft to a neutral position in the steering device, a shaft coupling step of coupling one end portion of a shaft fixing member to an end portion of the steering shaft at the neutral position of the steering shaft, and an upper column coupling step of coupling another end portion of the shaft fixing member to the upper column by axially moving the shaft fixing member while maintaining the neutral position of the steering shaft.

According to the present embodiments, it is possible to prevent rotation of the steering shaft while the steering column transports and enhance assemblability, simplify the assembly process, and minimize cost increases by implementing an anti-shaft rotation structure easy to remove and assemble from/with the steering wheel.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which:

FIG. 2 is an exploded perspective view illustrating a portion of a steering device of a vehicle according to the present embodiments;

DETAILED DESCRIPTION

Figure 1:
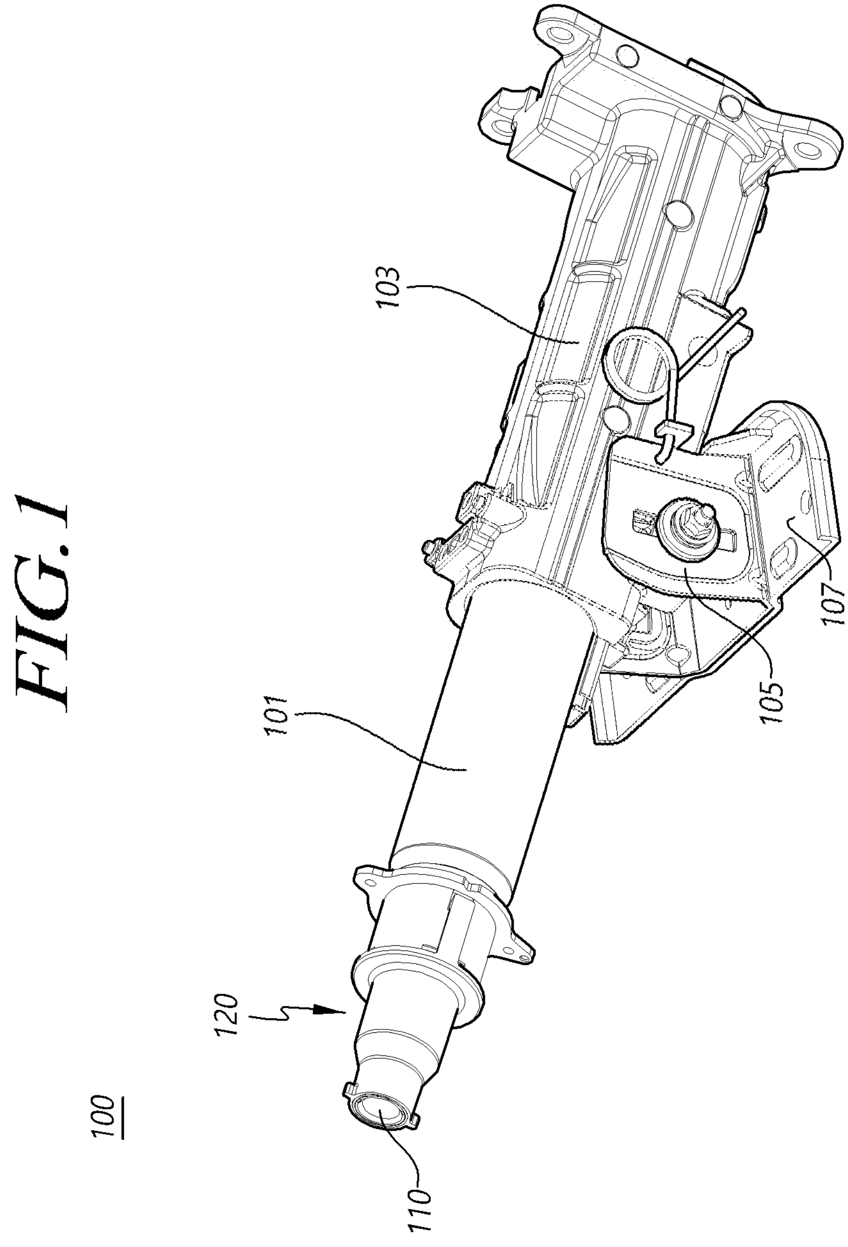
FIG. 1 is a perspective view illustrating a steering device of a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Figure 3:
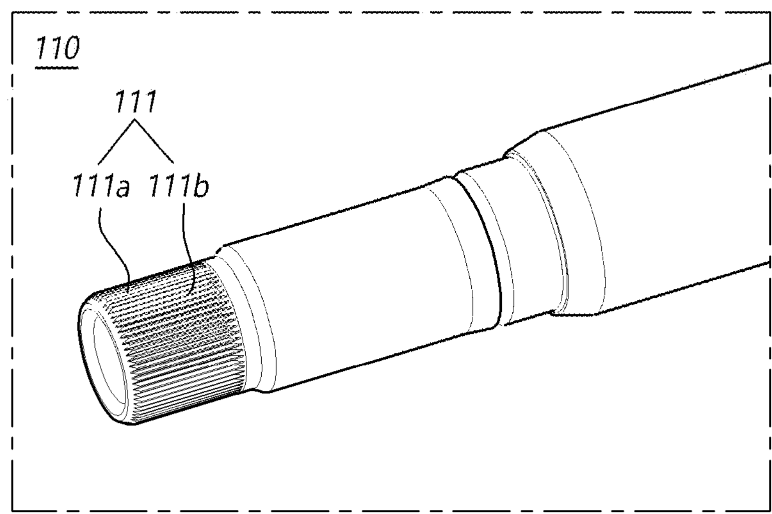
FIGS. 3 to 5 are perspective views illustrating a portion of a steering device of a vehicle according to the present embodiments.
Figure 4:
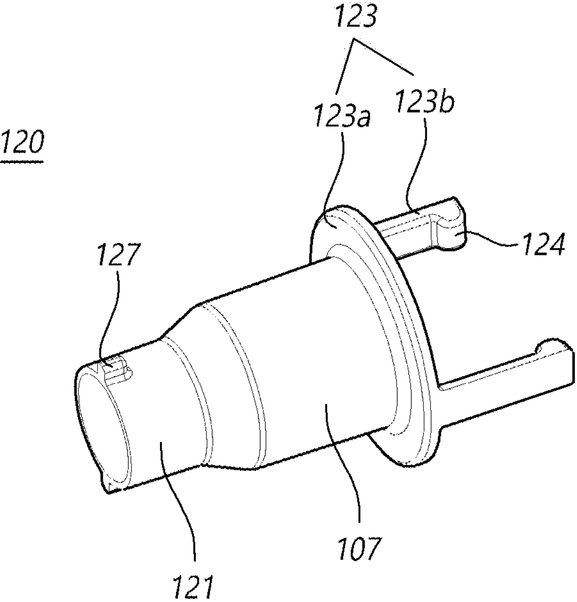
Figure 5:
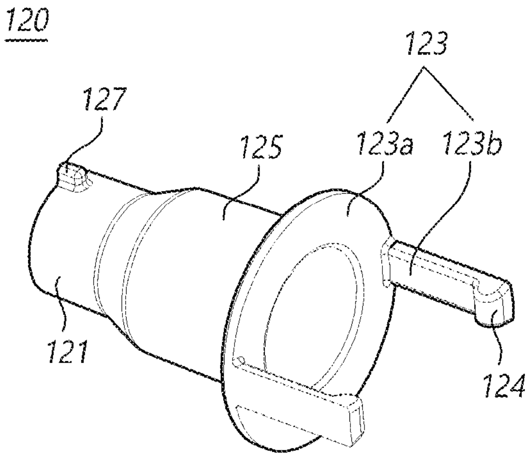
Figure 6:
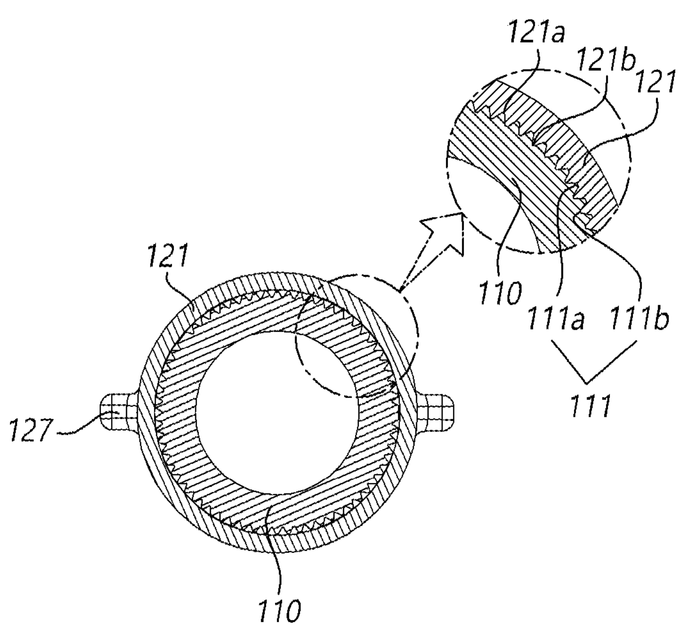
FIGS. 6 to 8 are cross-sectional views illustrating a portion of a steering device of a vehicle according to the present embodiments.
Figure 7:
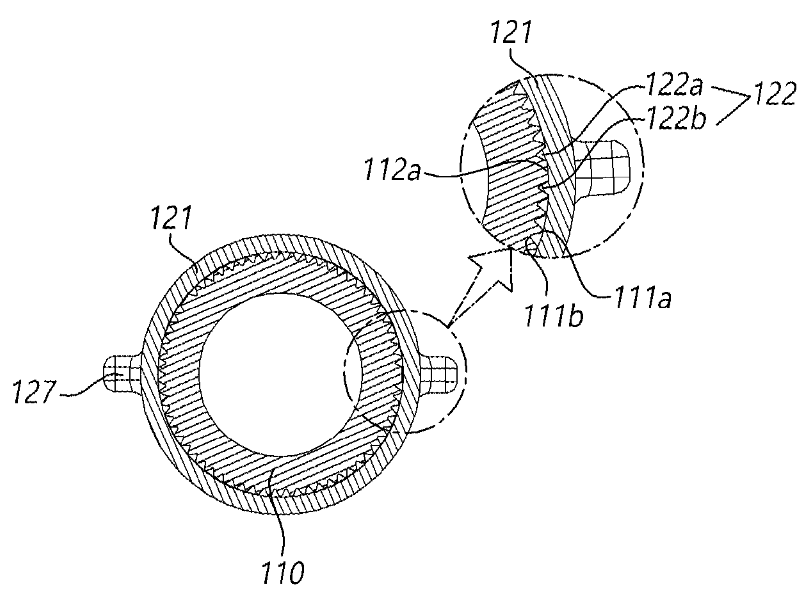
Figure 8:
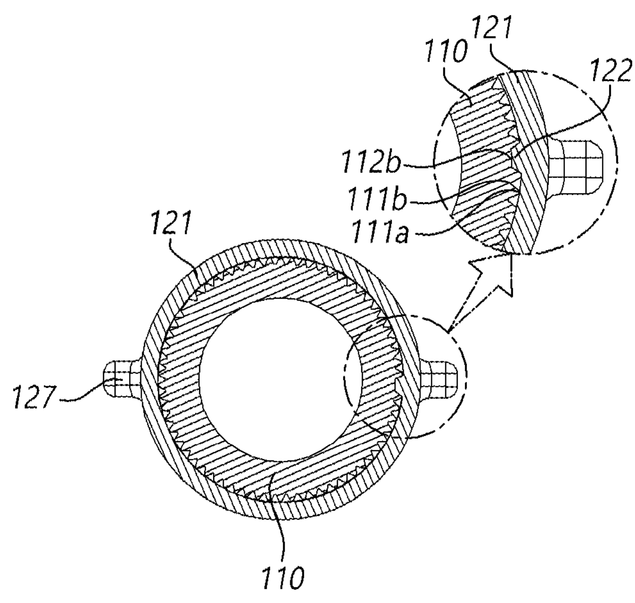
Figure 9:
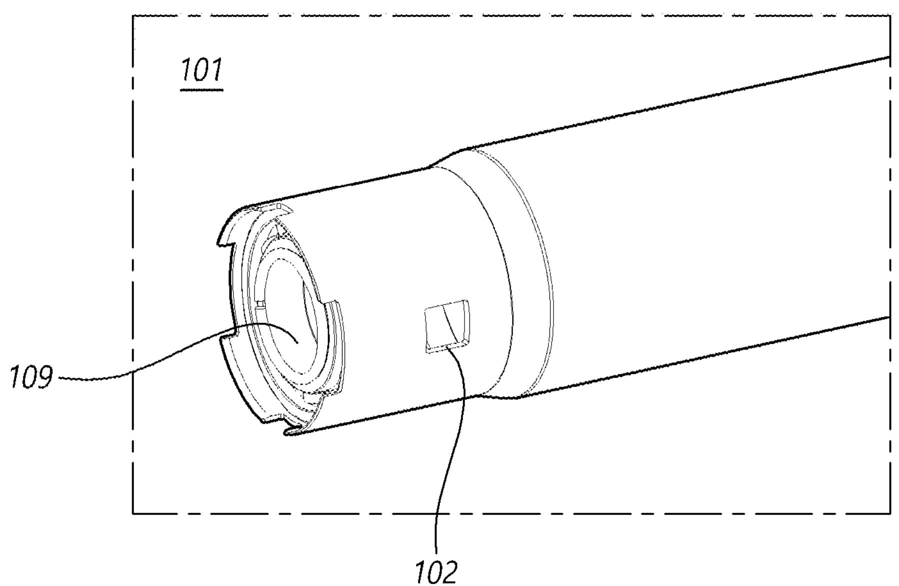
FIG. 9 is a perspective view illustrating a portion of a steering device of a vehicle according to the present embodiments.
Figure 10:
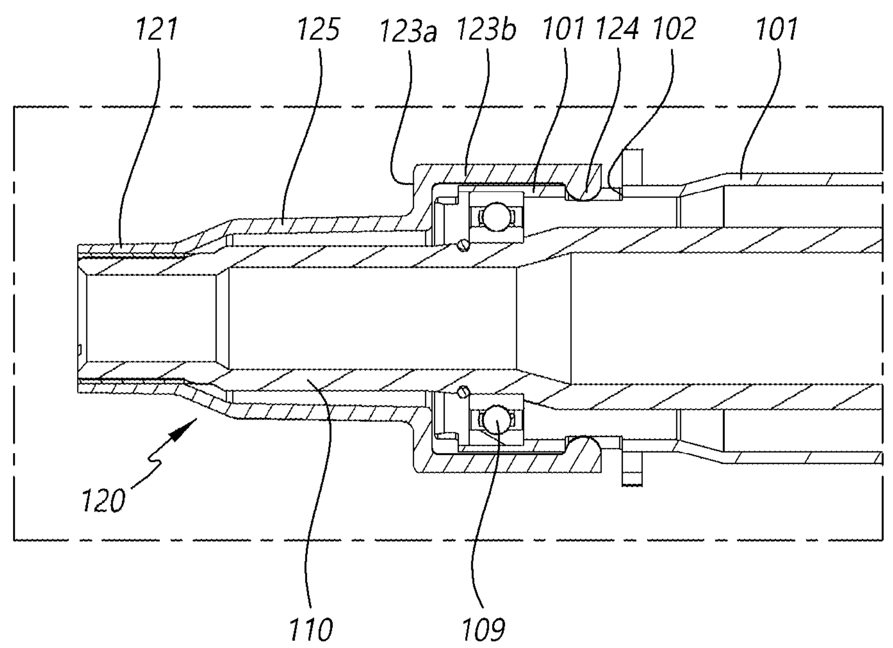
FIGS. 10 and 11 are cross-sectional views illustrating a portion of a steering device of a vehicle according to the present embodiments.
Figure 11:
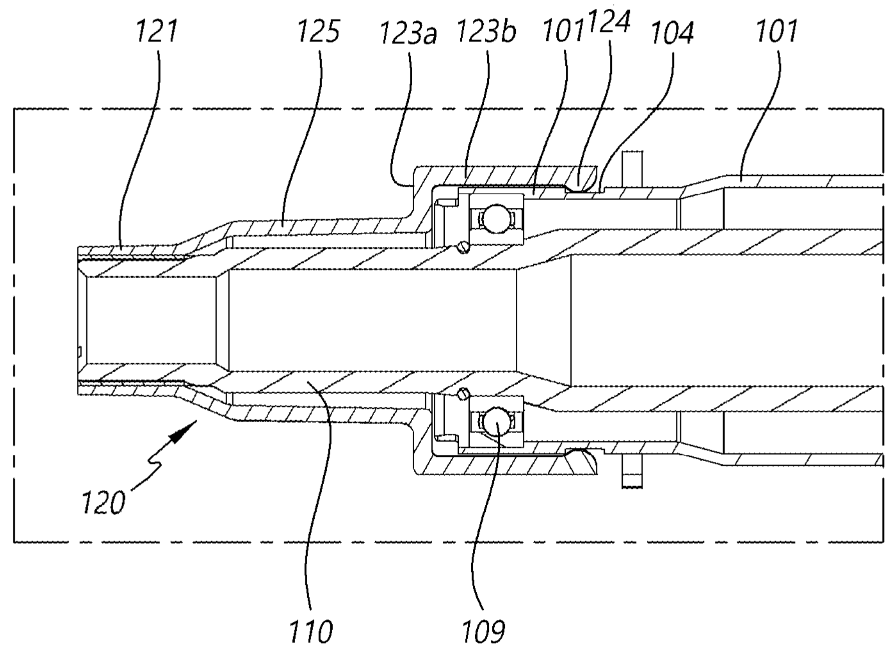

FIG. 1 is a perspective view illustrating a steering device of a vehicle according to the present embodiments. FIG. 2 is an exploded perspective view illustrating a portion of a steering device of a vehicle according to the present embodiments. FIGS. 3 to 5 are perspective views illustrating a portion of a steering device of a vehicle according to the present embodiments. FIGS. 6 to 8 are cross-sectional views illustrating a portion of a steering device of a vehicle according to the present embodiments. FIG. 9 is a perspective view illustrating a portion of a steering device of a vehicle according to the present embodiments. FIGS. 10 and 11 are cross-sectional views illustrating a portion of a steering device of a vehicle according to the present embodiments.

A description is made below with reference to FIGS. 1 and 5.

According to the present embodiments, there may be provided a vehicle steering device 100, comprising a steering shaft 110 having a toothed portion 111 having a plurality of mountains 111*a* and valleys 111*b* axially formed on an outer circumferential surface of an end portion thereof and circumferentially arranged, and rotated with a steering wheel to transfer a steering force, an upper column 101 formed in a hollow shape and having the steering shaft 110 coupled to and rotatingly supported on an inner circumferential side thereof, and a shaft fixing member 120 having one side end coupled to the steering shaft 110 and another side end coupled to the upper column 101 to fix the steering shaft 110.

Referring to FIG. 1, a vehicle steering device 100 according to the present embodiments includes a steering shaft 110, an upper column 101, a lower column 103, a tilt bracket 105, a mounting bracket 107, or the like.

The steering shaft 110 has a toothed portion 111 having a plurality of mountains 111*a* and valleys 111*b* axially formed on an outer circumferential surface of an end portion thereof and circumferentially arranged, and is coupled with the steering wheel manipulated by the driver to rotate together the steering wheel to transfer a steering force.

The upper column 101 formed in a hollow shape has the steering shaft 110 coupled to and rotatingly supported on an inner circumferential side thereof. A bearing 109 rotatingly supporting the steering shaft 110 is coupled to the inner circumferential side of the end portion of the upper column 101.

The upper column 101 is coupled to an inside in an end portion of the lower column 103 to axially telescope, and a mounting bracket 107 is coupled to the outside of the lower column 103 to fix the column and the tilt bracket 105 enabling tilting and telescoping of the column to the vehicle body.

Since the steering device should be coupled to the vehicle body at the neutral position of the steering wheel, the shaft fixing member 120 is coupled to the steering shaft 110 and the upper column 101 to prevent rotation of the steering shaft 110 until before it is assembled with the steering wheel.

One side end of the shaft fixing member 120 is coupled to the steering shaft 110, and the other side end of the shaft fixing member 120 is coupled to the upper column 101 to fix the steering shaft 110 and is removed immediately before assembled with the steering wheel.

According to an embodiment, the shaft fixing member 120 may be formed of an engineering plastic material. For example, the shaft fixing member 120 may be formed of polyacetal.

The shaft fixing member 120 includes a shaft coupling portion 121 where an end portion of the steering shaft 110 is inserted, a tube coupling portion 123 coupled to the outer circumferential surface of the upper column 101, and a body portion 125 connecting the shaft coupling portion 121 and the tube coupling portion 123.

The shaft coupling portion 121 and the body portion 125, and the tube coupling portion 123 are formed in a hollow shape which gradually increases in diameter. As shown in FIG. 6, valleys 121*a* and mountains 121*b* corresponding to the mountains 111*a* and the valleys 111*b* of the toothed portion 111 provided at the end portion of the steering shaft 110 may be provided on the inner circumferential surface of the shaft coupling portion 121.

As shown in FIGS. 7 and 8, at least one insertion protrusion 122 inserted to the vehicle 111*b* of the toothed portion 111 formed at the end portion of the steering shaft 110 may be provided on the inner circumferential surface of the shaft coupling portion 121.

Referring to FIG. 7, a mountain connecting portion 112*a* circumferentially connecting two or more mountains is provided on the outer circumferential surface of the end portion of the steering shaft 110, and a pair of insertion protrusions 122*a* and 122*b* respectively inserted to the valleys on two circumferentially opposite sides of the mountain connecting portion 112*a* are provided on the inner circumferential surface of the shaft coupling portion 121.

Referring to FIG. 8, a valley connecting portion 112*b* circumferentially connecting two or more valleys is provided on the outer circumferential surface of the end portion of the steering shaft 110, and an insertion protrusion 122 tightly contacting the inside of the valley connecting portion 112*b* is provided on the inner circumferential surface of the shaft coupling portion 121.

Referring to FIGS. 1 and 2 together with FIGS. 4 and 5, the tube coupling portion 123 may include an end portion support portion 123*a* supported on an end portion of the upper column 101 and an outer circumferential surface support portion 123*b* extending from the end portion support portion 123*a* to be supported on the outer circumferential surface of the upper column 101.

The end portion support portion 123*a* extends with a diameter increased from an end of the body portion 125 toward the outer circumferential side to be larger than the diameter of the upper column 101, and a lower surface of the end portion support portion 123*a* is coupled while axially supported on an end portion of the upper column 101.

Therefore, when the worker assembles the shaft fixing member 120, the assembly may be completed by pushing it until the end portion support portion 123*a* touches the upper column 101, and the assembly may be done at the accurate axial position.

The outer circumferential surface support portion 123*b* may be formed to extend axially from the outer circumferential surface of the end portion support portion 123*a*. One or more outer circumferential surface support portions 123*b* may be provided. In the present embodiments, an example in which two outer circumferential surface support portions 123*b* are provided is illustrated.

A support portion 124 supported on the outer circumferential surface of the upper column 101 may be provided at an end portion of the outer circumferential surface support portion 123*b*.

The support portion 124 is formed to protrude radially from the inner surface of the end portion of the outer circumferential surface support portion 123*b*, and the support portion 124 may be supported in tight contact with the outer circumferential surface of the upper column 101.

Further, as shown in FIGS. 9 and 10, the upper column 101 may have a fixing hole 102 penetrating the outer circumferential surface and inner circumferential surface of the upper column 101 and where there the support portion 124 is inserted and fixed.

Two opposite side surfaces of the support portion 124 may be vertically connected to a side surface of the outer circumferential surface support portion 123*b*, and the inner surface of the support portion 124 may be formed as a convex surface.

Accordingly, the support portion 124 may be smoothly inserted to the fixing hole 102 by pushing the end portion support portion 123*a* to touch the upper column 101 during assembly of the shaft fixing member 120, and the assembly may be completed, and rotation in the circumferential direction is prevented.

Further, an insertion groove 104 where the support portion 124 of the shaft fixing member 120 is inserted and fixed may be provided on the outer circumferential surface of the upper column 101 as shown in FIG. 11.

Two opposite side surfaces of the support portion 124 may be vertically connected to a side surface of the outer circumferential surface support portion 123*b*, and the inner surface of the support portion 124 may be formed as a convex surface.

Accordingly, the support portion 124 may be smoothly inserted to the fixing hole 102 by pushing the end portion support portion 123*a* to touch the upper column 101 during assembly of the shaft fixing member 120, and the assembly may be completed, and rotation in the circumferential direction is prevented.

Further, as shown in FIGS. 4 and 5, at least two protruding end portions 127 may be formed to protrude radially on the outer circumferential surface of the shaft coupling portion 121. In the present embodiments, an example in which two protruding end portions 127 are provided is illustrated.

The protruding end portion 127 allows the worker to more easily grip when removing the shaft fixing member 120 immediately before assembling the steering wheel.

Further, as shown in FIGS. 7 and 8, the protruding end portion 127 may be provided on the radial outer circumferential surface facing the inner circumferential surface where the insertion protrusion 122 is formed, so that if the shaft fixing member 120 is assembled with the position of the protruding end portion 127 aligned to the mountain connecting portion 112*a* of the steering shaft 110, the neutral position may be maintained until before it is assembled with the steering wheel.

A method for assembling a steering device according to the present embodiments may comprise a shaft aligning step of aligning a steering shaft 110 to a neutral position in the steering device 100, a shaft coupling step of coupling one end portion of a shaft fixing member 120 to an end portion of the steering shaft 110 at the neutral position of the steering shaft 110, and an upper column coupling step of coupling another end portion of the shaft fixing member 120 to the upper column 101 by axially moving the shaft fixing member 120 while maintaining the neutral position of the steering shaft 110.

A method for assembling a steering device 100 is described below.

In the steering device 100, to prevent rotation of the steering shaft 110 until before the steering wheel is assembled, after the steering shaft 110 is aligned to the neutral position, the shaft fixing member 120 is sequentially coupled to the steering shaft 110 and the upper column 101.

The shaft coupling step couples an end portion of the shaft fixing member 120 to an end portion of the aligned steering shaft 110.

The shaft coupling step axially inserts the insertion protrusion 122*a* or 122*b* formed on the inner circumferential surface of the shaft fixing member 120 to the mountain connecting portion 112*a* formed by connecting two or more mountains to the end portion of the steering shaft 110.

In other words, as shown in FIG. 7, a mountain connecting portion 112*a* circumferentially connecting two or more mountains is provided on the outer circumferential surface of the end portion of the steering shaft 110, and a pair of insertion protrusions 122*a* and 122*b* respectively inserted to the valleys on two circumferentially opposite sides of the mountain connecting portion 112*a* are provided on the inner circumferential surface of the shaft coupling portion 121, and they are coupled to each other.

As shown in FIG. 8, a valley connecting portion 112*b* is provided on the outer circumferential surface of the end portion of the steering shaft 110, and an insertion protrusion 122 tightly contacting the inside of the valley connecting portion 112*b* is provided on the inner circumferential surface of the shaft coupling portion 121, and they may be coupled to each other.

The upper column coupling step may insert and couple the support portion 124 formed to protrude on the inner circumferential surface of the outer circumferential surface support portion 123*b* axially extending from the other end portion of the shaft fixing member 120 to the fixing hole 102 formed in the outer circumferential surface of the upper column 101.

In other words, as shown in FIGS. 4 and 5, the shaft fixing member includes an end portion support portion 123*a* supported on an end portion of the upper column 101 and an outer circumferential surface support portion 123*b* extending from the end portion support portion 123*a* to be supported on the outer circumferential surface of the upper column 101.

The support portion 124 is formed to protrude radially from the inner surface of the end portion of the outer circumferential surface support portion 123*b* and, as shown in FIGS. 9 and 10, the support portion 124 of the outer circumferential surface support portion 123*b* may be inserted and coupled to the fixing hole 102 of the upper column 101.

The steering device assembly method may include a column fixing step of fixing a mounting bracket 107 of the steering device 100 in a state in which two opposite ends of the shaft fixing member 120 are coupled to the steering shaft 110 and the upper column 101, to a body of a vehicle, and separating the shaft fixing member 120 and coupling a steering wheel to the steering shaft 110 while the steering device 100 is fixed to the body.

According to the present embodiments, it is possible to prevent rotation of the steering shaft while the steering column transports and enhance assemblability, simplify the assembly process, and minimize cost increases by implementing an anti-shaft rotation structure easy to remove and assemble from/with the steering wheel.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims.

The invention claimed is:

1. A vehicle steering device, comprising:

a steering shaft having a toothed portion having a plurality of mountains and valleys axially formed on an outer circumferential surface of an end portion thereof and circumferentially arranged, and rotated with a steering wheel to transfer a steering force;

an upper column formed in a hollow shape and having the steering shaft coupled to and rotatingly supported on an inner circumferential side thereof; and a shaft fixing member having one side end coupled to the steering shaft and another side end coupled to the upper column to fix the steering shaft, wherein the shaft fixing member includes:

a shaft coupling portion where an end portion of the steering shaft is inserted;

a tube coupling portion coupled to an outer circumferential surface of the upper column; and a body portion connecting the shaft coupling portion and the tube coupling portion, wherein the tube coupling portion includes:

an end portion support portion supported on an end portion of the upper column; and an outer circumferential surface support portion extending from the end portion support portion and supported on an outer circumferential surface of the upper column, wherein the shaft coupling portion, the body portion, and the end portion support portion are hollow, and the outer circumferential surface support portion is rod-shaped and extends in the axial direction, such that rotation of the end portion of the steering shaft is restrained by the shaft coupling portion and rotation of the upper column is restrained by the outer circumferential surface support portion.

2. The vehicle steering device of claim 1, wherein mountains and valleys corresponding to the mountains and valleys of the toothed portion are provided on an inner circumferential surface of the shaft coupling portion.

3. The vehicle steering device of claim 1, wherein at least one insertion protrusion inserted to the valley of the toothed portion is provided on an inner circumferential surface of the shaft coupling portion.

4. The vehicle steering device of claim 1, wherein a mountain connecting portion circumferentially connecting two or more mountains is provided on an outer circumferential surface of an end portion of the steering shaft, and a pair of insertion protrusions respectively inserted to valleys on two circumferentially opposite sides of the mountain connecting portion are provided on an inner circumferential surface of the shaft coupling portion.

5. The vehicle steering device of claim 1, wherein a valley connecting portion circumferentially connecting two or more valleys is provided on an outer circumferential surface of an end portion of the steering shaft, and an insertion protrusion tightly contacting an inside of the valley connecting portion is provided on an inner circumferential surface of the shaft coupling portion.

6. The vehicle steering device of claim 1, wherein the end portion support portion extends with a diameter increased toward an outer circumference of the body portion to be larger than a diameter of the upper column and is axially supported on the end portion of the upper column.

7. The vehicle steering device of claim 6, wherein the outer circumferential surface support portion is formed to axially extend from an outer circumferential surface of the end portion support portion and has a support portion provided at the extended end portion to be supported on the outer circumferential surface of the upper column.

8. The vehicle steering device of claim 7, wherein the support portion is formed to radially protrude from an inner surface of an end portion of the outer circumferential surface support portion.

9. The vehicle steering device of claim 8, wherein the upper column has a fixing hole penetrating an outer circumferential surface and an inner circumferential surface to have the support portion inserted and fixed.

10. The vehicle steering device of claim 9, wherein two opposite side surfaces of the support portion are vertically connected with a side surface of the outer circumferential surface support portion, and wherein an inner surface of the support portion is formed as a convex surface.

11. The vehicle steering device of claim 8, wherein an insertion groove where the support portion is inserted and fixed is provided in the outer circumferential surface of the upper column.

12. The vehicle steering device of claim 11, wherein two opposite side surfaces of the support portion are vertically connected with a side surface of the outer circumferential surface support portion, and wherein an inner surface of the support portion is formed as a convex surface.

13. The vehicle steering device of claim 4, wherein at least one protruding end portion formed to radially protrude is formed on the outer circumferential surface of the shaft coupling portion.

14. The vehicle steering device of claim 13, wherein the protruding end portion is provided on a radial outer circumferential surface facing the inner circumferential surface where the insertion protrusion is formed.

15. A method for assembling a steering device, comprising:

a shaft aligning step of aligning, in the steering device, a steering shaft to a neutral position, the steering shaft having, at an end portion thereof, a mountain connecting portion connecting two or more mountains in a circumferential direction;

a shaft coupling step of moving a shaft fixing member toward the end portion of the steering shaft, the shaft fixing member including a hollow shaft coupling portion into which the end portion of the steering shaft is inserted, a hollow end support portion supported on an end portion of an upper column, a hollow body portion connecting the shaft coupling portion and the end support portion, and an outer circumferential surface support portion extending from the end support portion and having a rod shape, and coupling the shaft fixing member to the steering shaft by inserting a pair of insertion protrusions formed on an inner circumferential surface of the shaft coupling portion into grooves on opposite sides of the mountain connecting portion of the steering shaft when the steering shaft is in the neutral position; and an upper column coupling step of coupling an end portion of the outer circumferential surface support portion to the upper column by axially moving the shaft fixing member while maintaining the neutral position of the steering shaft.

16. The method of claim 15, wherein the upper column coupling step includes inserting, into a fixing hole formed in an outer circumferential surface of the upper column-, a support portion protruding from an inner surface of the outer circumferential surface support portion toward the outer circumferential surface of the upper column.

17. The method of claim 16, further comprising:

a column fixing step of fixing a mounting bracket of the steering device, where two opposite ends of the shaft fixing member are coupled to the steering shaft and the upper column, to a body of a vehicle; and separating the shaft fixing member and coupling a steering wheel to the steering shaft while the steering device is fixed to the body.

* * * * *